June 21, 1949.  R. E. McKELVEY  2,473,963
SPEED SELECTION UNIT

Filed Feb. 28, 1948  3 Sheets-Sheet 1

INVENTOR.
ROBERT E. McKELVEY,
BY Hazard & Miller
ATTORNEYS.

June 21, 1949.  R. E. McKELVEY  2,473,963
SPEED SELECTION UNIT
Filed Feb. 28, 1948  3 Sheets-Sheet 2

INVENTOR.
ROBERT E. McKELVEY,
BY
Hazard & Miller
ATTORNEYS.

June 21, 1949. R. E. McKELVEY 2,473,963
SPEED SELECTION UNIT
Filed Feb. 28, 1948 3 Sheets-Sheet 3

INVENTOR.
ROBERT E. McKELVEY,
BY
Hazard & Miller
ATTORNEYS.

Patented June 21, 1949

2,473,963

UNITED STATES PATENT OFFICE 2,473,963

SPEED SELECTION UNIT

Robert E. McKelvey, Los Angeles, Calif.

Application February 28, 1948, Serial No. 12,099

14 Claims. (Cl. 74—217)

This invention relates to a speed selection unit which is adapted to be mounted or applied to a motor so that varying speeds can be obtained from the motor and this invention constitutes an improvement on my application, Serial No. 652,879 of March 8, 1946, and is copending therewith.

A main object of the present invention is to provide a speed selection unit so designed that when mounted on a motor a large range of speeds can be obtained from the motor quickly and easily without requiring the operator to loosen set screws or nuts or use wrenches, pliers or the like. The speed selection unit of the present invention comprises a countershaft which is mounted on the motor so as to be parallel to the rotor of the motor and there is a drive, preferably a sheave and belt drive, from one end of the rotor shaft to one end of the countershaft and a drive, preferably a sheave and belt drive, from the other end of the countershaft to a rotating means preferably rotating sheaves rotatably mounted about the other end of the rotor shaft. Various sheave mounting means on which the sheaves are mounted are preferably designed so that the sheaves on the ends of the countershaft and rotor shaft may be freely interchanged so that different sheave ratios can be obtained to thereby obtain different speeds. This quick interchange system is obtained specifically by providing splined sheave mounting means and providing sheaves having inside matching splines and constructing the sheave mounting means with snap means so that the sheaves may be merely snapped off different sheave mounting means and snapped onto other sheave mounting means.

Another object of this invention is to provide a speed reduction unit which can be applied to a motor which speed reduction unit has interchangeable splined sheaves as above set out and in which the countershaft is adjustable toward and away from the rotor shaft by means of a simple and quick adjusting means, which adjusting means is so constructed that with only a few sheaves and belts a great number of different speeds can be obtained since the sheaves may be freely interchanged and the adjusting means used to compensate not only for different size sheaves used with the same size belt but also to compensate for different size belts and also to function as a belt tensioner.

Another object of this invention is to provide a speed selection unit which can be applied to practically any size or type of motor as the motor is set up or used in a shop or factory without disassembling the machine on which the motor is mounted, without requiring any drilling or threading of holes in the motor and without requiring any additional space.

Another object of this invention is to provide a speed reduction unit which can be applied to a motor and which will reduce the speed and increase the torque of the motor so that wood working power tools can be easily converted to metal working tools.

Another object of this invention is to provide a speed reduction unit which is so designed that when the torque is increased several belts may be used in the part of the device in which the torque increase is most so that there is no slippage in the transmission of power from the motor to the machine which is driving.

Another object of this invention is to provide a speed reduction unit as above set out in which the large number of speeds referred to above can be obtained with a relatively few parts and a relatively inexpensive device.

With the foregoing and other objects in view, which will be made manifest in the following detailed description and specifically pointed out in the appended claims, reference is had to the accompanying drawings for an illustrative embodiment of the invention, wherein:

Figure 1 discloses a side elevation view of a drill press showing the device of the present invention applied to the driving motor of the drill press;

Figure 1:
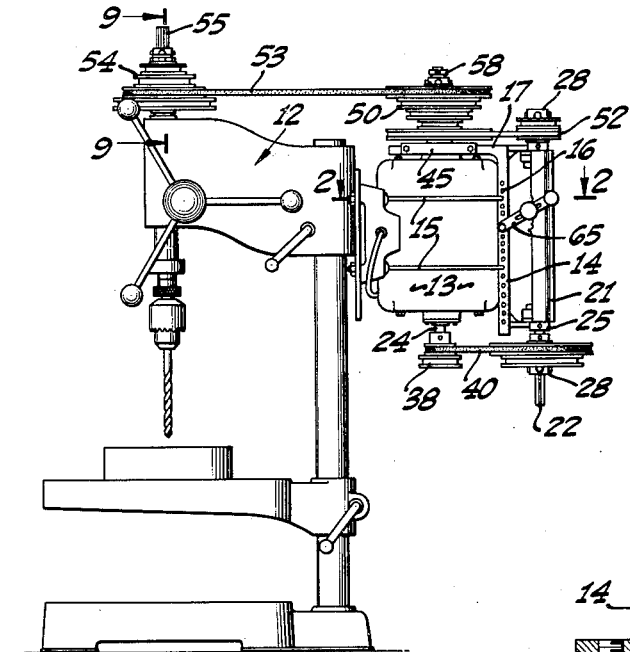

Referring to the accompanying drawings wherein similar reference characters designate similar parts throughout, a drill press generally entitled 12 having an electric motor 13 fixedly mounted thereon is to be used for purposes of illustration but is not intended to limit the invention as the speed selection unit of the present invention can be applied to all types and sizes of motors on all kinds of machines but is particularly useful when applied to motors used to drive drill presses, jig saws, band saws, shapers, sanders, grinders, buffing machines, lathes and the like. A bracket generally entitled 14 is applied to motor 13 by means of encircling bands 15 which, as can be seen from Fig. 2, pass through holes 16 provided in bracket 14 and around the motor 13 and tighten therearound by means of nuts 17 which thread down on one end of each band onto an eye 18 formed in the other end of each band. The plurality of holes 16 permit the bands to be fitted through appropriate holes so that the bracket 14 can be applied to all sizes and shapes of motors. Bracket 14 is preferably of generally L-shaped channeled construction and has upstanding ears 19 through which a shaft 20 is rotatably supported. A pivoting member 21 is pivoted about shaft 20 and supports a countershaft 22 by means of bearings 23, said countershaft having its axis substantially parallel to the rotor shaft 24 of the motor 13. Collars 25 are fixedly mounted on countershaft 22 so as to properly position the countershaft on pivoting member 21.

Figure 2:
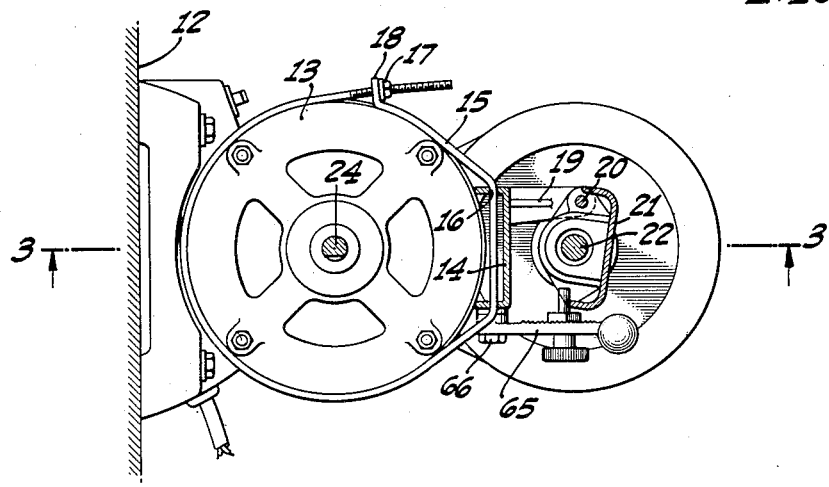
Fig. 2 is a sectional view along lines 2—2 of Fig. 1.

Outside splined collars 28 are mounted on countershaft 22 and prevented from rotating thereabouts by means of set screws 29 which fit within flats or grooves provided on countershaft 22, see Fig. 2. The countershaft is preferably designed long enough so as to adapt it to fit a wide range of sizes of motors since by merely shifting the splined collars 28 along the countershaft the sheaves which are mountable on these splined collars are lined up with sheaves which are mounted on the rotor shaft of the motor. Each splined collar 28 has belt grooves 30 preferably V-shaped belt grooves formed therein for purposes to be described. Sheaves 31 having inside splines are slidable over and mountable on splined collars 28 and are held against shoulders 32 on collars 28 by snap means comprising balls 33 and springs 35. A sheave member 38 is mounted on one end of rotor shaft 24 by means of a set screw 39 which fits within a flat or groove provided on said one end of the rotor shaft 24 so as to prevent the sheave member 38 from rotating. Although, as has been brought out herein before the splined collars 28 and sheave member 38 are fastened on their respective shafts by means of set screws, once these set screws are set there is no necessity to loosen or tighten them when switching sheaves, all the various speeds being obtainable without the necessity of the removal, tightening or loosening of any set screw. The sheave member 38, shown in Fig. 3 has a small V groove formed therein and a larger V groove formed therein and power is transmitted from this member and from motor 13 by means of a belt 40, a V belt if the sheaves have V-shaped grooves therein, to one of the sheaves 31 mounted on the lower splined collar 28 shown in Fig. 3 and power is transmitted through countershaft 22 to the small sheaves 31 on the upper collar 28.

One leg of the L-shaped bracket 14 extends across one end face of motor 13 and is slotted or cut out so as to enable this end of the bracket to straddle the end of the rotor shaft 24 protruding from motor 13. The slot or cut out in bracket 13 is such as to adapt the bracket to fit a wide range of motors without interference between the bracket and the rotor shafts of any of the motors.

Figure 3:
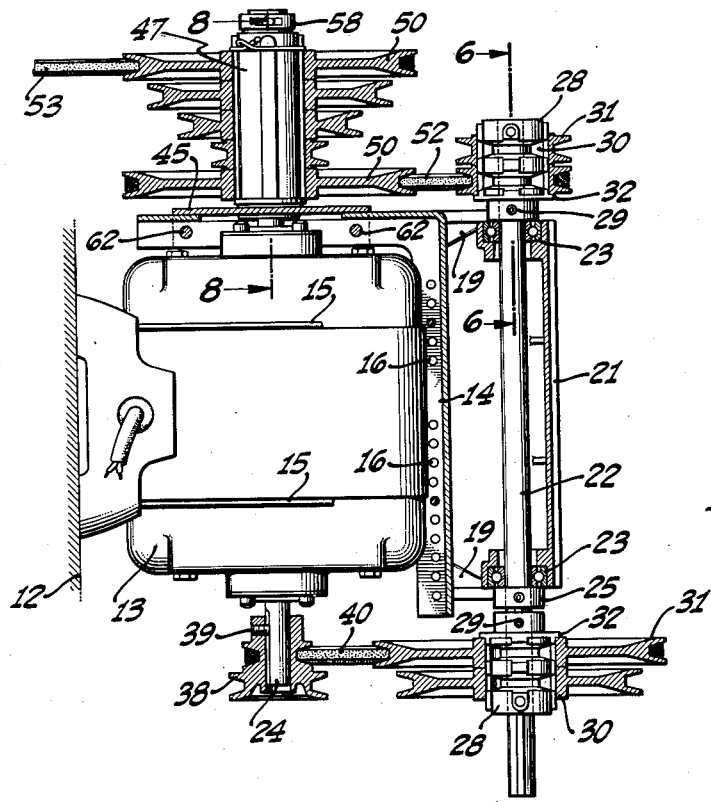
Fig. 3 is a sectional view along lines 3—3 of Fig. 2.
Figure 6:
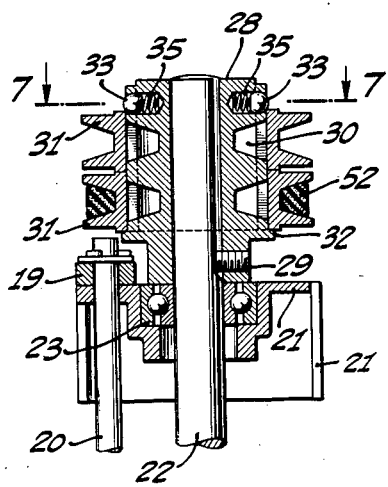
Fig. 6 is a sectional view along lines 6—6 of Fig. 3.
Figure 7:
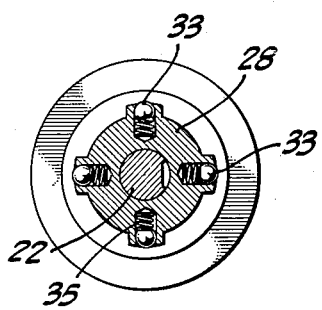
Fig. 7 is a sectional view along lines 7—7 of Fig. 6.
Figure 8:
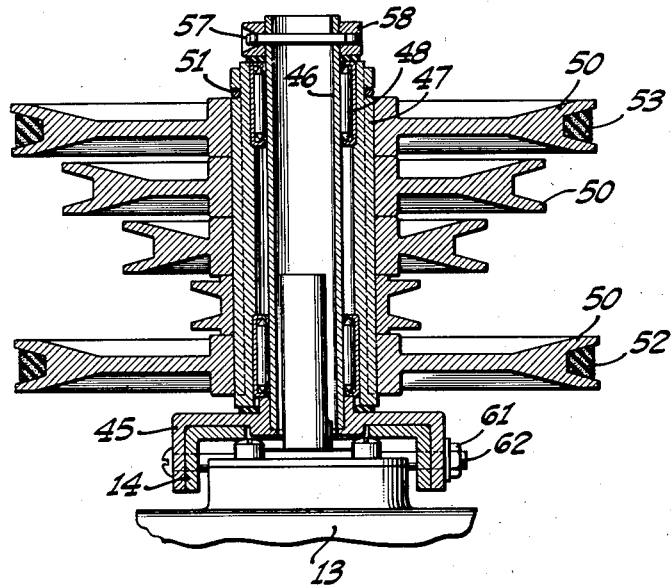
Fig. 8 is a sectional view along lines 8—8 of Fig. 3.
Figure 10:
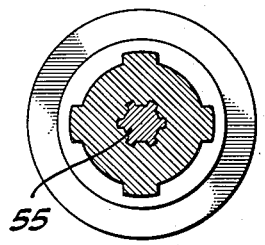
Fig. 10 is a sectional view along lines 10—10 of Fig. 9.
Figure 11:
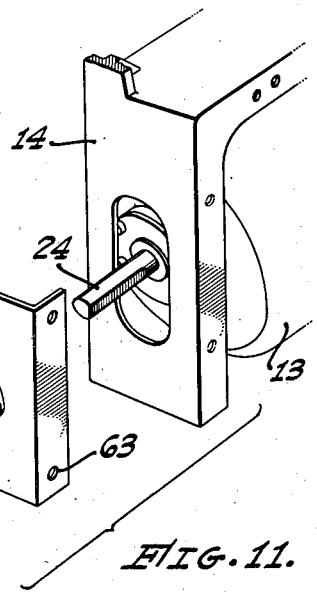
Fig. 11 is a perspective view showing the saddle in position to be applied to the bracket.
Figure 9:
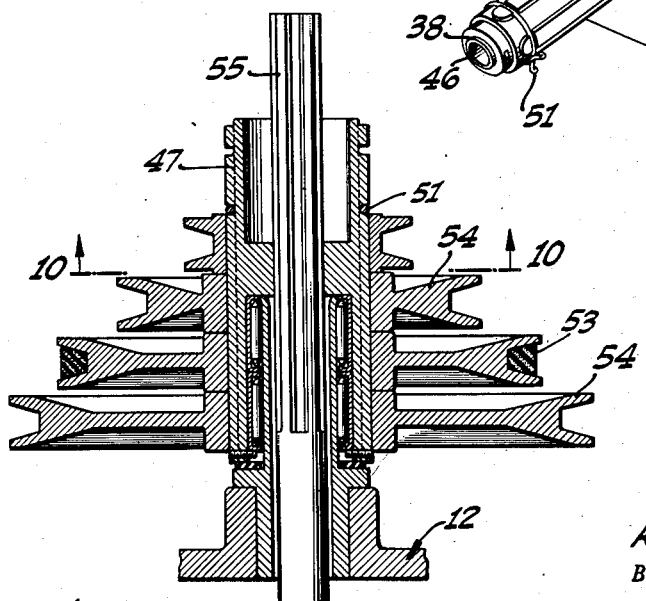
Fig. 9 is a sectional view along lines 9—9 of Fig. 1.

A saddle 45 preferably of channel shape is provided and has a hollow shaft 46 securely fastened thereto at one of its ends, as shown in Fig. 8, said shaft enclosing the end of the rotor shaft 24 and supporting a rotatable splined collar 47 which is rotatably mounted on hollow shaft 46 by means of bearings 48 which preferably are needle bearings. Sheaves 50 having inside splines are slidable over and mountable on splined collar 47 and the sheaves are kept in place on collar 47 by snap means 51 which may be similar in construction to snap means 34 and 35, but it is possible that due to the fact that collar 47 is comparatively thin that a snap means similar to 34 or 35 may not conveniently be provided on collar 47 in which case snap means 51 may take the form of a spring loop with bent ends, as shown in Figs. 3 and 11, in which case the spring loop would fit within a groove 49 provided around the splined collar 47. The lower sheaves 50 on splined collar 47 receive power by means of belt 52 from sheaves 31 on upper splined collar 28 on countershaft 22 and the upper sheaves 50 transmit power by means of belt 53 to sheaves 54 which are mounted about a splined spindle 55 of the drill press 12. A key 57 such as a cotter pin is provided and passes through apertures in a collar 58 and hollow shaft 46 so as to keep collar 47 in place on hollow shaft 46.

Saddle 45 may be fastened to bracket 14 in any suitable way, one way being by means of nuts 61 and bolts 62, see Fig. 8. The saddle is preferably formed with holes 63 therein whereas the sides of the leg of bracket 14 which extends across the end of motor 13 are preferably left blank and when the device is applied to a motor the bracket is first applied and the various sheaves set on the countershaft and the saddle adjusted until the correct tension on belt 52 is obtained; then holes are drilled in bracket 14, as shown in Fig. 11 in dot dash lines, and nuts 61 and bolts 62 used to fasten the saddle 45 to bracket 14. Actually the adjustment of saddle 45 will be such as to position hollow shaft 46 approximately concentric with the end of rotor shaft protruding therethrough.

Preferably collars 28 and 47 are of such size that sheaves 31 and 50 are interchangeable so that by merely pulling or snapping the sheaves off over the snap means on the collars, the sheaves may be switched around and numerous combinations obtained particularly when different size belts are used.

Figure 4:
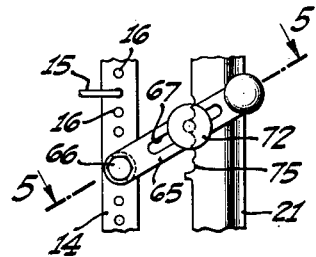
Fig. 4 is an enlarged partial view of Fig. 2 showing the means for adjusting the countershaft.
Figure 5:
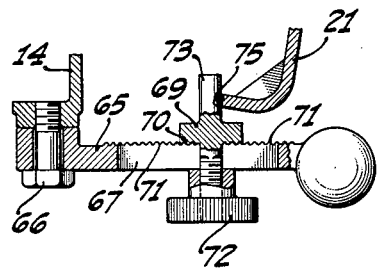
Fig. 5 is an enlarged sectional view along lines 5—5 of Fig. 4.

Adjusting means are provided for adjusting the countershaft 22 relative to the rotor shaft 24 so that correct tension on the belts transmitting and receiving power will always be maintained regardless of the size of sheaves used and these adjusting means also adjust the countershaft when the same size belts are used with different size sheaves or when different size belts are used. By this arrangement the number of belts and sheaves required is materially cut down since the number of speeds can be markedly increased by the addition of a single sheave which is of different size than the sheaves already being used since the single new sheave can be applied to both ends of the countershaft and to the rotor shaft creating new ratios in each position. This adjusting means comprises a lever 65 which is pivoted to bracket 14 at 66 and has a slot 67 therein in which rides a contacting piece 69. Piece 69 has teeth 70 provided thereon so that contacting piece 69 can mesh with teeth 71 provided on the back of lever 65 and as can be seen from Fig. 5, and when the knurled nut 72, which is threaded on piece 69, is loosened piece 69 may be set up and down along lever 65. Contacting piece 69 provides a shaft 73 which is designed to engage scalloped portions 75 provided on pivoting member 21, as shown in Fig. 4, and it can be seen that when lever 65 is moved downwardly as the lever is depicted in Figs. 1 and 4 that shaft 73 will successively engage different scalloped portions 75 of pivoting member 21 and successively move member 21 outward from motor 13 thereby moving countershaft 22 further away from rotor shaft 24. By this arrangement the sheaves may be readily switched around, different size belts used and the correct tension maintained. It will be appreciated that when it is desired to change sheaves or belts that it is only necessary to flip lever 65 so as to release pivoting member 21 and when the proper adjustment is made lever 65 can be quickly brought into engagement with the proper scalloped portion on member 21. A preferred manner of using the adjusting means is to set the contacting piece 69 along lever 65 until the shaft 72 rides in the middle scalloped portion whereby if any other further adjustments are desired the tension on the belt can be either increased or decreased.

It will be appreciated by the above adjusting construction that the adjustment means functions as a vernier between different size sheaves and different size belts.

As an example of how different speeds can be obtained with the device, belt 40 in the position shown in Figs. 1 and 3 allows four different speeds to be taken off of collar 47. If belt 40 is shifted down lower on the sheave member 38 and to the lowest sheave member 31, four other speeds can be obtained. The upper sheave member 31 on countershaft 22 could be removed and other belts used in place of belt 52 and run over the sheaves provided on upper collar 28, which adjustment gives eight more speeds, four for each position of the belt 40. The different size sheaves could be snapped onto upper and lower collars 28 and for each combination a wider range of speeds is obtained.

In the description, the collars 28 have been referred to as being positioned on the ends of countershaft 22 although this, of course, is not important as they may be positioned adjacent the ends or in any other position where power can be transmitted to countershaft 22 and transmitted from countershaft 22.

Although the invention has been described with respect to sheaves and belts it is obvious that sprockets and chains could be substituted therefor with equal facility or even gears could be used and the adjusting means adapted therefor.

When the sheave ratios on the countershaft and rotor shaft is such that there is a material reduction in speed there results a material and corresponding increase in torque so that in some cases it may be desirable to have two belts on the upper end, as shown in Fig. 3, of the countershaft transmitting power to the sheaves 50 and collar 47 so that there will be no slippage at that point in the speed reduction unit.

Various changes may be made in the details of construction without departing from the spirit and scope of the invention as defined by the appended claims.

I claim:
1. A device to be mounted on a motor to enable varying speeds to be obtained from the motor comprising a bracket means adapted to be applied to the motor, a countershaft rotatably supported by the bracket means so as to have its axis parallel to the rotor shaft of the motor, outside splines provided adjacent each end of the countershaft, sheaves slidable over and mountable on the splines, the sheaves adjacent one end of countershaft receiving power from one end of the rotor shaft, the sheaves on the other splined section transmitting power from the countershaft to sheaves rotatable about the other end of the rotor shaft.

2. A device to be mounted on a motor to enable varying speeds to be obtained from the motor comprising a bracket means adapted to be applied to the motor, a countershaft rotatably supported by the bracket means so as to have its axis parallel to the rotor shaft of the motor, outside splines provided adjacent each end of the countershaft, sheaves slidable over and mountable on the splines, snap means for keeping the sheaves on the splines and permitting the sheaves to be snapped off, the sheaves adjacent one end of countershaft receiving power from one end of the rotor shaft, the sheaves on the other splined section transmitting power from the countershaft to sheaves rotatable about the other end of the rotor shaft.

3. A device to be mounted on a motor to enable varying speeds to be obtained from the motor comprising a bracket means adapted to be applied to the motor, a countershaft rotatably supported by the bracket means so as to have its axis parallel to the rotor shaft of the motor, a collar for each end of the countershaft adapted to be fixed thereto, the collars having outside splines thereon, sheaves slidable over and mountable on the collars, the sheaves on one collar being adapted to receive power from one end of the rotor shaft, said bracket means enclosing the other end of the rotor shaft and providing a rotatable splined collar thereabouts, other sheaves slidably over and mountable on the last named splined collar, at least some of the last named sheaves adapted to receive power from the sheaves on the other collar on the countershaft and the remaining of the last named sheaves adapted to transmit power therefrom.

4. A device to be mounted on a motor to enable varying speeds to be obtained from the motor comprising a bracket means adapted to be applied to the motor, a countershaft rotatably supported by the bracket means so as to have its axis parallel to the rotor shaft of the motor, a collar for each end of the countershaft adapted to be fixed thereto, the collars having outside splines, sheaves slidable over and mountable on the collars, snap means for maintaining the sheaves in place on the collars, the collars being so constructed that the sheaves may be interchanged, the sheaves on one collar being adapted to receive power from one end of the rotor shaft, said bracket means enclosing the other end of the rotor shaft and providing a rotatable splined collar thereabout, other sheaves slidable over and mountable on the last named splined collar, said last named splined collar being so constructed that the sheaves thereon may be interchanged with the sheaves on either of the other two collars, at least some of the last named sheaves adapted to receive power from the other collar on the countershaft and the remaining of the last named sheaves adapted to transmit power therefrom.

5. A device to be mounted on a motor to enable varying speeds to be obtained from the motor comprising a bracket means adapted to be applied to the motor, a countershaft so rotatably supported by the bracket means as to have its axis parallel to the rotor shaft of the motor and to be adjustable toward and away from the rotor shaft, a collar for each end of the countershaft, the collars having outside splines thereon, sheaves having matching inside splines slidable over and mountable on the collars, snap means for maintaining the sheaves in place on the collars, each collar being adapted to support a plurality of sheaves, the sheaves on one collar being adapted to receive power from the rotor shaft by means of a belt drive, and other sheaves rotatably mounted about the other end of the rotor shaft, the sheaves on the other collar adapted to transmit power to said other sheaves by means of a belt drive.

6. A device to be mounted on a motor to enable varying speeds to be obtained from the motor comprising a bracket means adapted to be applied to the motor, a supporting member pivoted to said bracket means, a countershaft rotatably supported by the supporting member so as to have its axis parallel to the rotor shaft and spaced from the pivotal axis, a lever means pivoted to the bracket means and adapted to engage the supporting member at a point spaced from the pivotal axis so as to pivot the supporting member, means for transmitting power from the rotor shaft to the countershaft, said bracket means providing a rotatable collar about the other end of the rotor shaft, means for transmitting power from the rotor shaft to the rotatable collar, said lever means being adapted to be moved so as to adjust the countershaft toward and away from the rotor shaft so as to tension the power transmitting means.

7. A device to be mounted on a motor to enable varying speeds to be obtained from the motor comprising a bracket means adapted to be applied to the motor, a supporting member pivoted to said bracket means, a countershaft rotatably supported by the supporting member so as to have its axis parallel to the rotor shaft and spaced from the pivotal axis, a lever pivoted to the bracket means and adapted when moved to engage successive parts of the supporting member so as to move the countershaft toward or away from the rotor shaft, means for transmitting power from the rotor shaft to the countershaft, means rotatable about the other end of the rotor shaft, means for transmitting power from the other end of the countershaft to the rotatable means, said power transmission means being tensioned upon movement of the lever means.

8. A device to be mounted on a motor to enable varying speeds to be obtained from the motor comprising a bracket means adapted to be applied to the motor, a supporting member pivoted to said bracket means, a countershaft rotatably supported by the supporting member so as to have its axis parallel to the rotor shaft and spaced from the pivotal axis, a lever means pivoted to the bracket means, said supporting member having scalloped edges thereon, said lever means having a part thereof slidable along the lever means and adapted to engage the supporting member in the scalloped portions thereof, said scalloped portions being so located that upon successive engagements with successive portions thereof the countershaft is moved away from the rotor shaft, means for transmitting power from the rotor shaft to the countershaft, rotating means rotatable about the other end of the rotor shaft, and means for transmitting power from the countershaft to the rotating means.

9. A device to be mounted on a motor to enable varying speeds to be obtained from the motor comprising a bracket means adapted to be applied to the motor, a countershaft rotatably supported by the bracket means so as to have its axis parallel to the rotor shaft of the motor, means provided adjacent the ends of the countershaft to receive sheaves thereover, said sheaves providing belt grooves therearound, some of the sheaves adapted to receive power from the rotor shaft by means of a belt drive, other of the sheaves adapted to transmit power from the countershaft to means rotating about the other end of the rotor shaft, said second named means having belt grooves thereabouts whereby when the sheaves thereon are removed belt drives can transmit power directly to the first named means.

10. A device to be mounted on a motor to enable varying speeds to be obtained from the motor comprising a bracket means adapted to be applied to the motor, a countershaft rotatably supported by the bracket means so as to have its axis parallel to the rotor shaft of the motor, a collar for each end of the countershaft adapted to be fixed thereto, the collars having outside splines thereon, sheaves having inside splines and providing belt grooves therearound slidable over and mountable on the collars, the sheaves on one collar being adapted to receive power from one end of the rotor shaft by means of a belt drive, rotating means rotatable about the other end of the rotor shaft, belt means adapted to transmit power from the sheaves mounted on the other collar of the countershaft to the last named means, the collars on the countershafts having at least one belt groove provided therearound whereby when the sheaves on the collars are removed belt drives can transmit power directly to the collars so as to receive power from the motor and transmit power from the countershaft.

11. A device to be mounted on a motor to enable varying speeds to be obtained from the motor comprising a bracket means adapted to be applied to the motor, a countershaft rotatably supported by the bracket means so as to have its axis parallel to the rotor shaft of the motor, said countershaft being adjustable toward and away from the rotor shaft, a collar for each end of the countershaft adapted to be fixed thereto, the collars having outside splines thereon, sheaves having inside splines and providing belt grooves slidable over and mountable on the collars, the sheaves on one collar being adapted to receive power from one end of the rotor shaft by means of a belt drive, said bracket means extending across one end of the motor and straddling the other end of the rotor shaft, a saddle adapted to be mounted on the bracket means providing a hollow stationary shaft enclosing the other end of the rotor shaft, other sheaves providing belt grooves thereabouts rotatably mounted on the hollow stationary shaft, belt means adapted to transmit power from the sheaves on the other collar on the countershaft to the last named sheaves, said collars being so constructed that the sheaves thereon are interchangeable, and said collars having at least one belt groove provided therearound whereby when the sheaves on these collars are removed belt drives can transmit power directly to the collars so as to receive power from the motor and transmit power to the sheaves mounted on the hollow stationary shaft.

12. A device to be mounted on a motor to enable varying speeds to be obtained from the motor comprising a channeled L-shaped bracket adapted to be applied to the motor, one leg of the L-shaped bracket having an opening therein permitting said one leg to extend across one end of the motor and straddle one end of the rotor shaft of the motor, sheaves rotatable about said one end of the rotor shaft and supported from the bracket, a countershaft rotatably supported by the other leg of the bracket so as to have its axis parallel to the rotor shaft, means for transmitting power from the other end of the rotor shaft to the countershaft, and means for transmitting power from the countershaft to the sheaves.

13. A device to be mounted on a motor to enable varying speeds to be obtained from the motor comprising a bracket means adapted to be applied to the motor, a supporting member pivoted to said bracket means, a countershaft rotatably supported by the supporting member so as to have its axis parallel to the rotor shaft and spaced from the pivotal axis, a lever means pivoted to the bracket means and adapted to engage the supporting member at a point spaced from the pivotal axis so as to pivot the supporting member, means for transmitting power from the rotor shaft to the countershaft, said bracket means providing a collar positioned adjacent the end of the motor opposite the end from which power is transmitted to the countershaft rotatable about an axis in alignment with the axis of the rotor shaft, means for transmitting power from the rotor shaft to the rotatable collar, said lever means being adapted to be moved so as to adjust the countershaft toward and away from the rotor shaft so as to tension the power transmitting means.

14. A device to be mounted on a motor to enable varying speeds to be obtained from the motor comprising a bracket means adapted to be applied to the motor, a supporting member pivoted to said bracket means, a countershaft rotatably supported by the supporting member so as to have its axis parallel to the rotor shaft and spaced from the pivotal axis, a lever pivoted to the bracket means and adapted when moved to engage successive parts of the supporting member so as to move the countershaft toward or away from the rotor shaft, means for transmitting power from the rotor shaft to the countershaft, means positioned adjacent the end of the motor opposite the end from which power is transmitted to the countershaft rotatable about an axis in alignment with the axis of the rotor shaft, and means for transmitting power from the other end of the countershaft to the rotatable means, said power transmission means being tensioned upon movement of the lever means.

ROBERT E. McKELVEY.

No references cited.